(12) United States Patent
He

(10) Patent No.: US 8,392,399 B2
(45) Date of Patent: Mar. 5, 2013

(54) QUERY PROCESSING ALGORITHM FOR VERTICALLY PARTITIONED FEDERATED DATABASE SYSTEMS

(75) Inventor: Xin He, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 116 days.

(21) Appl. No.: 12/883,420

(22) Filed: Sep. 16, 2010

(65) Prior Publication Data

US 2012/0072414 A1 Mar. 22, 2012

(51) Int. Cl.
*G06F 7/00* (2006.01)
*G06F 17/30* (2006.01)

(52) U.S. Cl. .......................... 707/713; 707/802

(58) Field of Classification Search .......... 707/713, 707/719, 754, 751, 768, 773, 774, 780, 752, 707/E17.041–E17.043, 802, E17.017, 796, 707/791

See application file for complete search history.

(56) References Cited

U.S. PATENT DOCUMENTS

| | | | |
|---|---|---|---|
| 6,578,046 B2 | 6/2003 | Chang et al. | |
| 7,340,447 B2 * | 3/2008 | Ghatare | 707/754 |
| 7,653,709 B1 * | 1/2010 | Miakinen | 709/223 |
| 8,103,654 B2 * | 1/2012 | Gilula | 707/713 |
| 2003/0212664 A1 * | 11/2003 | Breining et al. | 707/3 |
| 2003/0212863 A1 * | 11/2003 | Ganguly et al. | 711/118 |
| 2005/0097118 A1 * | 5/2005 | Slutz | 707/101 |
| 2005/0102297 A1 * | 5/2005 | Lloyd et al. | 707/100 |
| 2006/0218123 A1 * | 9/2006 | Chowdhuri et al. | 707/2 |
| 2007/0198471 A1 | 8/2007 | Schneider et al. | |
| 2008/0016045 A1 * | 1/2008 | Breining et al. | 707/3 |
| 2008/0104088 A1 * | 5/2008 | Kuriyama et al. | 707/100 |
| 2009/0006314 A1 * | 1/2009 | Balmin et al. | 707/2 |
| 2009/0177697 A1 | 7/2009 | Gao et al. | |
| 2009/0234799 A1 * | 9/2009 | Betawadkar-Norwood et al. | 707/2 |
| 2009/0254836 A1 * | 10/2009 | Bajrach | 715/745 |

OTHER PUBLICATIONS

Kevin Chen-Chuan Chang & Seung-won Hwang—"Minimal probing: supporting expensive predicates for top-k queries"—Proceeding SIGMOD '02 Proceedings of the 2002 ACM SIGMOD international conference on Management of data—(pp. 346-357).*
Won Kim, Jorge Garza and Ali Keskin—"Spatial data management in database systems: Research directions"—Advances in Spatial Databases—Lecture Notes in Computer Science, 1993, vol. 692/1993 (pp. 1-13).*
Lim et al., "Query Optimization and Processing in Federated Database Systems," 1993, University of Minnesota, pp. 1-3.
Evrendilek et al., "Query Decomposition, Optimization and Processing in Multidatabase Systems," 1995, http://reference.kfupm.edu.sa/content/q/u/query_decomposition_optimization_and_pr_2793969.pdf.
Igras, "A Framework for Query Processing in a Federated Database System: A Case Study," 1994, http://libraries.maine.edu/Spatial/gisweb/spatdb/urisa/ur94016.html.

* cited by examiner

*Primary Examiner* — Anh Ly
(74) *Attorney, Agent, or Firm* — Workman Nydegger

(57) ABSTRACT

Querying data stores in a federation of data stores. A first search filter is accessed. The first search filter is constructed with one or more nested logical AND, OR, or NOT operands. The first search filter is normalized to a normalized search filter that is logically equivalent to the first search filter. The normalized search filter includes 3 or 4 levels. All first level operands are logically ORed. All second level operands are logically ANDed. All third level operands are at least one of parameters or logical NOTs. Any fourth level operands are parameters. The normalized search filter is used to search a plurality of data stores in a federation of data stores for information by searching different data stores for at least two or more of the top level operands.

16 Claims, 2 Drawing Sheets

QUERY PROCESSING ALGORITHM FOR VERTICALLY PARTITIONED FEDERATED DATABASE SYSTEMS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnected computer systems can be used to create federated systems where a plurality of systems are joined together to provide some functionality. For example, a federated database system includes of a collection of individual database systems, where each is an independent fully functioning DBMS and holds a subset of the data set of the whole system. Each of the databases in the federated database system may be referred to as a database partition. Together, the individual database systems offer a distributed view of the whole data set. In such a system, the data set could be partitioned vertically along the properties. In such systems, each database partition holds a set of the properties of all objects.

When the data set is partitioned vertically, none of the individual database systems have a complete view of any object in the federated system. However, generic query languages, like LDAP, allow the use of search predicates (or filters) that involve an arbitrary subset of the properties of an object. Such a filter could be constructed with nested AND, OR, and NOT operands. There are no fixed patterns, and the complexity could be very high. Therefore, it may be technically very challenge to service generic queries in a vertically partitioned federated database system, efficiently with minimal resource consumption.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing environment. The method includes acts for querying data stores in a federation of data stores. The method includes accessing a search predicate. The search predicate is constructed with one or more nested logical AND, OR, or NOT operands. The search predicate is normalized to a normalized search predicate that is logically equivalent to the search predicate. The normalized search predicate includes three or four levels. All top or first level operands are logically ORed. All second level operands below the top level operands are logically ANDed. At a third level, all third level operands below the second level operands are either parameters or logical NOTs. At the fourth or bottom level any fourth level operands below a third level logical NOT operand at the third level are parameters. The normalized search predicate is used to search a plurality of data stores in a federation of data stores for information by searching different data stores for at least two or more of the top level operands.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality for breaking down a query into subqueries, each targeted against one individual data store, such as a database system within a federation of data stores. In some embodiments, the subqueries may be further screened based on their projected efficiencies, and subqueries may be selected and executed against their targeted individual database systems. The results returned by the subqueries may be aggregated and further evaluated to yield the final query result.

In particular, embodiments may (1) use an algorithm to break down an arbitrary query and (2) process a generic query. In the following example, LDAP (Lightweight Directory Access Protocol) filters are used to demonstrate the algorithm, but this algorithm can be applied to other query languages with similar capabilities.

An LDAP filter can be constructed with logical expressions and items. For purposes of this discussion, three logical operators will be discussed: AND(& or ∧), OR(| or ∨), NOT(!). AND and OR operators may have anywhere from one to many operators. AND is logically true if all of its operands are true. OR is logically true if any of its operands are true. This includes when more than one of its operands are true. NOT only operates on a single operand and is only true if its operand is false. Thus, AND and OR have multiple parameters. NOT has one parameter. Items each compare a property with a constant value.

Figure 1:
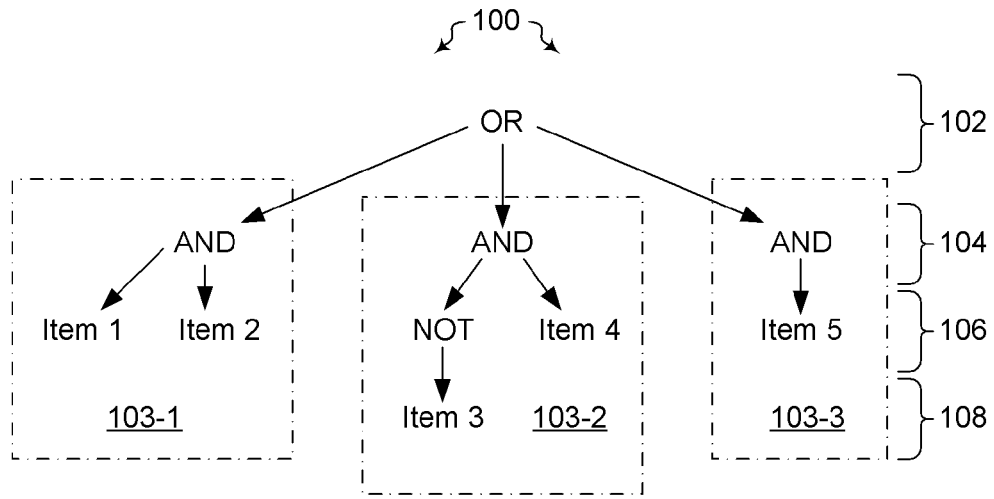
FIG. 1 illustrates a normalized filter.

Referring now to FIG. 1, a normalized filter 100 is shown. The normalized filter 100 is at most 4 levels deep. The first level 102 includes logically ORed operands 103-1, 103-2, and 103-3. The second level 104 includes three operands: AND expression on item1 and item2; AND expression on NOT item3 and item4; and AND expression on item5. The third levels 106 can be either items or NOT operators. The fourth level is items and exists when the item has a NOT operator in the third level 106 above. For example, item3 has a NOT operator above it in the third level 106.

For easy reference, each parameter or operand of the top OR operator is referred to as an OR component, and each parameter or operand of a second level AND is referred to as an AND sub-filter. Thus, for a given a normalized filter (A OR B), where A is ($a_1$ AND $b_1$) and B is ($a_2$ AND $b_2$), A and B are components; and $a_1$, $b_1$, $a_2$, and $b_2$, are sub-filters.

A normalized filter allows embodiments to use divide-and-conquer rules for sub-filter selection. Illustratively, the OR divide-and-conquer rule for a search on a component filter (A OR B) can be done by searching with component filter A, searching with component filter B, and merging (i.e. performing a union on) the results. The AND divide-and-conquer rule for a search on a component filter (a AND b) can be done by searching with sub-filter a, obtain a list of objects $L_a$. The sub-filter b is then applied to $L_a$. In the case of a vertically partitioned databases, a may involve properties stored on one server X, b involves properties on another server Y. The AND divide-and-conquer rule allows evaluating a on server X, to obtain the set of objects La. The process then evaluates b against server Y on the objects in La.

Filter normalization may be achieved by applying various logic rules. In some embodiments, the rules are applied recursively. As noted above, AND (&) and OR (|) operator in LDAP search predicates have 1 to many operands. They are equivalent to binary AND and OR in the following way: (& a1 a2 . . . an) is equivalent to a1 $\wedge$ a2 $\wedge$ . . . $\wedge$ an, and (| a1 a2 . . . an) is equivalent to a1 $\vee$ a2 $\vee$ . . . $\vee$ an. The following illustrate a sample of logical rules that may be applied.

| | |
|---|---|
| $!(a \wedge b) = !a \vee !b$ | de Morgan's law |
| $!(a \vee b) = !a \wedge !b$ | de Morgan's law |
| $!!a = a$ | involution |
| $a \wedge (b \wedge c) = a \wedge b \wedge c$ | associativity |
| $a \wedge (b \vee c) = (a \wedge b) \vee (a \wedge c)$ | distributivity |
| $a \vee (b \vee c) = a \vee b \vee c$ | associativity |

Figure 2:
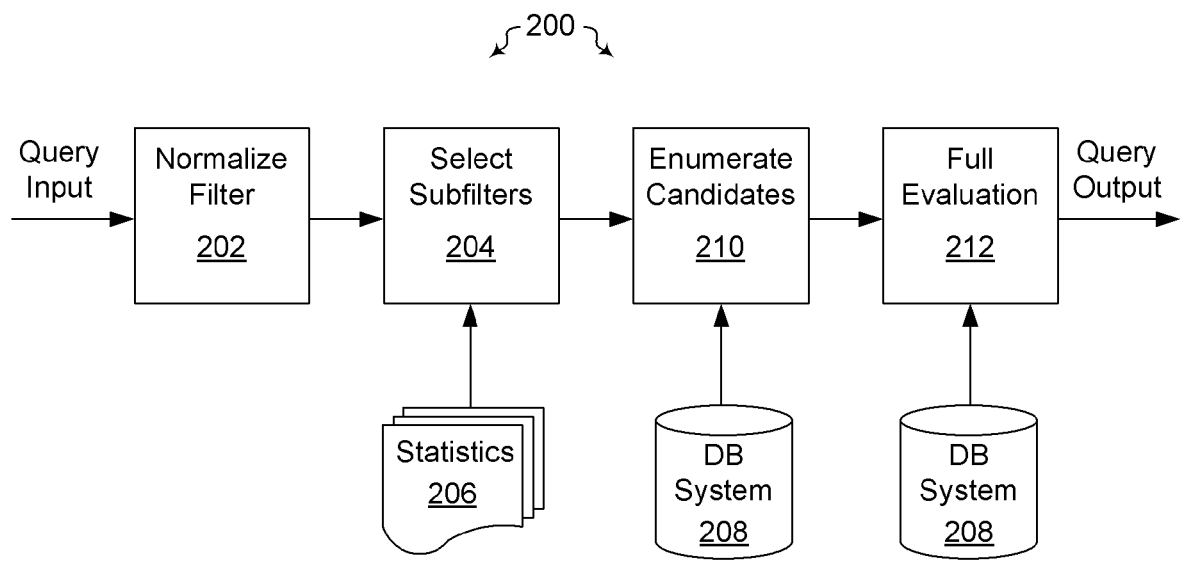
FIG. 2 illustrates query processing.

When a query filter is received by the system, the system will perform various steps to service the query. For example, as illustrated in FIG. 2, a first step 202 is to normalize the filter. In particular, given a query filter, embodiments re-factor the filter into an equivalent canonical format. This may be done by using the logical rules set forth above to re-factor the filter. Part of the normalization process allows the normalized filter to be partitioned into a set of OR components. For example, as illustrated FIG. 1, the first OR top level 102 has three components 103-1, 103-2, and 103-3.

A second step 204 is sub-filter selection: In this step, divide-and-conquer rules are applied. In particular, for each OR component (i.e. 103-1, 103-2, and 103-3), one sub-filter (i.e. an item from the third level 106) is selected. The results from these sub-filters are unioned. In particular, one AND-sub-filter item in the third level 106 is selected from each of the components in the second level 104 to obtain a list. Each AND-sub-filter that is selected can be selected, in one embodiment by comparing the estimated cost for executing queries for the sub-filters. As illustrated, statistics 206 regarding historical interaction with a database system 208 may be used to determine estimated costs for executing queries. In an alternative embodiment, a database system 208 may include specialized hardware that can determine the cost of executing queries. The least expensive query indicates which sub-filter to use. For example, Given a normalized filter (A OR B), where component A is ($a_1$ AND $b_1$) and component B is ($a_2$ AND $b_2$), a determination is made as to whether it is more cost effective to execute a query for $a_1$ or $b_1$ and a determination is made as to whether it is more cost effective to execute a query for $a_2$ or $b_2$. As each item, $a_1$, $a_2$, $b_1$, $b_2$ are associated with one property. Selecting $a_1$ vs. $b_1$ and $a_2$ vs. $b_2$ may also implicitly determine the data stores to which a filter is applied.

A third step is candidate enumeration 210. In this step, the selected sub-filters are executed and a list of candidates are returned. The list is a superset of the final objects returned. In the example above, assume that $a_1$ and $b_2$ are the least expensive queries. Thus, these queries will be run, resulting in lists $L_{a1}$ and $L_{b2}$. The union of $L_{a1}$ and $L_{b2}$ constitutes the set of candidate objects.

A fourth step is full evaluation: In this step, additional properties of the candidate objects are retrieved, and the full filter is evaluated. Those satisfying the full filter will be returned as result. For example, the properties used in $a_1$, $b_1$, $a_2$, and $b_2$ are retrieved from the database for all the candidate objects, then the whole filter (($a_1$ AND $b_1$) OR ($a_2$ AND $b_2$)) is applied to the candidate objects, and those that satisfy the whole filter constitute the final result.

The following illustrates a more concrete example. In this example, a query is made for an individual Bob Smith who lives at either 123 Anywhere Street or at GPS coordinates 40.246642,–111.649139. Thus, the original query is Bob Smith AND (123 Anywhere Street OR 40.246642,–111.649139). In this example, using the distributivity logical rule, this filter can be normalized to (Bob Smith AND 123 Anywhere Street) OR (Bob Smith AND 40.246642,–111.649139).

A determination can be made as to whether it is less expensive to query Bob Smith or 123 Anywhere Street and a determination can be made wither it is less expensive to query Bob Smith or 40.246642,–111.649139. Notably, in some embodiments, leveraged costs can be used to determine cost. For example, it may be less expensive to search for Bob Smith once than it is to search for 123 Anywhere Street and 40.246642,–111.649139, even though searching for Bob Smith is more expensive than either 123 Anywhere Street or 40.246642,–111.649139 individually. However, some embodiments may nonetheless select Bob Smith for a query based on leveraged cost where a single query can be used for several second level 104 queries. Thus, in the present example, a query may be made for Bob Smith to create a list.

For the objects returned in above query, the street address and their GPS location are retrieved from their respective servers. The filter 123 Anywhere Street may be applied to the list to obtain a first result and a filter 40.246642,–111.649139 may be applied to the list to obtain a second result. The first and second results are then unioned to yield the final result. In an alternative embodiment, the filters 123 Anywhere Street and 40.246642,–111.649139 may be applied to the list to obtain final a result.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
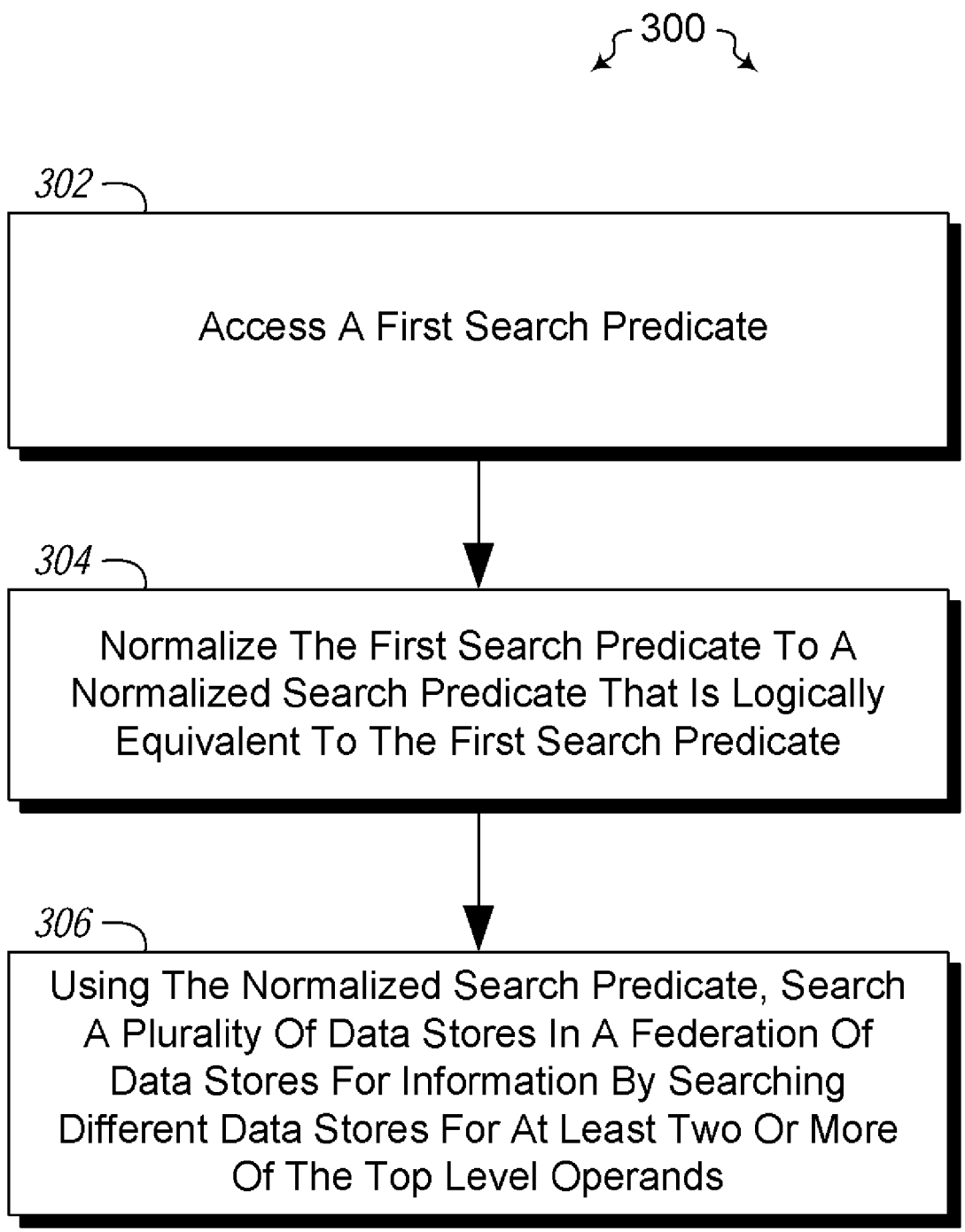
FIG. 3 illustrates a method of querying data stores in a federation of data stores.

Referring now to FIG. 3, a method 300 is illustrated. The method 300 may be practiced in a computing environment and includes acts for querying data stores in a federation of data stores. The method includes accessing a first search predicate (act 302). The first search predicate constructed with one or more nested logical AND, OR, or NOT operands.

The method 300 further includes normalizing the first search predicate to a normalized search predicate that is logically equivalent to the first search predicate (act 304). The normalized search predicate includes at least three and up to four levels. All top or first level operands are logically ORed. All second level operands below the top level operands are logically ANDed. At the third level, all third level operands below the second level operands are at least one of parameters or logical NOTs. At the fourth or bottom level any fourth level operands below a third level logical NOT operand at the third level are parameters. FIG. 1 illustrates an example of a normalized search predicate.

The method 300 further includes using the normalized search predicate, searching a plurality of data stores in a federation of data stores for information by searching different data stores for at least two or more of the top level operands (act 306).

The method 300 may be practiced where using the normalized search predicate, searching a plurality of data stores in a federation of data stores for information includes for each OR operand, selecting one component and unioning results from the selected components. This is an example of the OR divide and conquer approach discussed above.

The method 300 may be practiced where using the normalized search predicate, searching a plurality of data stores in a federation of data stores for information include for an AND component selecting a first sub-filter which is used to search a data store and applying a second sub-filter to results returned from searching the data store.

The method 300 may be practiced where using the normalized search predicate, searching a plurality of data stores in a federation of data stores for information includes for an AND component, selecting one sub-filter, by comparing estimated cost for executing queries.

The method 300 may be practiced where normalizing the first search predicate to a normalized search predicate comprises applying one or more logical rules to the first search predicate. For example, the logical rules outlined above may be used. In some embodiments, logical rules are applied recursively to normalize a predicate.

The method 300 may be practiced where using the normalized search predicate, searching a plurality of data stores in a federation of data stores for information includes determining estimated costs for executing queries and based on the determination, executing a query that is less expensive than another query. In some embodiments, determining estimated costs for executing queries includes using statistical data regarding historical interaction with a data store system. Alternatively, determining estimated costs for executing queries may include using specialized cost prediction modules included as part of a data store system.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware and/or software, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of querying data stores in a federation of data stores, the method comprising:
    accessing a first search predicate, the first search predicate constructed with one or more nested logical AND, OR, or NOT operands;
    normalizing the first search predicate to a normalized search predicate that is a canonical form logically equivalent to the first search predicate such that the normalized search predicate includes at least three and up to four ordered levels and the normalized search predicate is partitioned at the top level into a set of OR components, wherein normalizing the first search predicate to a normalized search predicate comprises applying one or more logical rules to the first search predicate and wherein logical rules are applied recursively,
    wherein all top or first level operands are logically ORed,
    wherein all second level operands below the top level operands are logically ANDed,
    wherein each third level operand below the second level operands is at least one of a parameter or logical NOT, and
    wherein any fourth level operands below a third level logical NOT operand are parameters; and
    using the normalized search predicate, searching a plurality of data stores in a federation of data stores for information by searching different data stores for at least two or more of the top level operands.

2. The method of claim 1, wherein using the normalized search predicate, searching a plurality of data stores in a federation of data stores for information comprises for each OR operand, selecting one component and unioning results from the selected components.

3. The method of claim 1, wherein using the normalized search predicate, searching a plurality of data stores in a federation of data stores for information comprises for an AND component, selecting one sub-filter, by comparing estimated cost for executing queries.

4. The method of claim 1, wherein using the normalized search predicate, searching a plurality of data stores in a federation of data stores for information comprises for an AND component selecting a first sub-filter which is used to search a data store and applying a second sub-filter to results returned from searching the data store.

5. The method of claim 1, wherein using the normalized search predicate, searching a plurality of data stores in a federation of data stores for information comprises determining estimated costs for executing queries and based on the determination, executing a query that is less expensive than another query.

6. The method of claim 5, wherein determining estimated costs for executing queries comprises using statistical data regarding historical interaction with a data store system.

7. The method of claim 5, wherein determining estimated costs for executing queries comprises using specialized cost prediction modules included as part of a data store system.

8. In a computing environment, a physical computer readable medium comprising computer executable instructions that when executed by one or more processors perform the following:
    accessing a first search predicate, the first search predicate constructed with one or more nested logical AND, OR, or NOT operands;
    normalizing the first search predicate to a normalized search predicate that is logically equivalent to the first search predicate such that the normalized search predicate includes at least three and up to four ordered levels and the normalized search predicate is partitioned at the top level into a set of OR components, wherein normalizing the first search predicate to a normalized search predicate comprises applying one or more logical rules to the first search predicate and wherein logical rules are applied recursively,
    wherein all top or first level operands are logically ORed,
    wherein all second level operands below the top level operands are logically ANDed,
    wherein each third level operand below the second level operands is at least one of a parameter or logical NOT, and
    wherein any fourth level operands below a third level logical NOT operand are parameters; and
    using the normalized search predicate, searching a plurality of data stores in a federation of data stores for information by searching different data stores for at least two or more of the top level operands.

9. The computer readable medium of claim 8, wherein using the normalized search predicate, searching a plurality of data stores in a federation of data stores for information comprises for each OR operand, selecting one component and unioning results from the selected components.

10. The computer readable medium of claim 8, wherein using the normalized search predicate, searching a plurality of data stores in a federation of data stores for information comprises for an AND component, selecting one sub-filter, by comparing estimated cost for executing queries.

11. The computer readable medium of claim 8, wherein using the normalized search predicate, searching a plurality of data stores in a federation of data stores for information comprises for an AND component selecting a first sub-filter which is used to search a data store and applying a second sub-filter to results returned from searching the data store.

12. The computer readable medium of claim 8, wherein using the normalized search predicate, searching a plurality of data stores in a federation of data stores for information comprises determining estimated costs for executing queries and based on the determination, executing a query that is less expensive than another query.

13. The computer readable medium of claim 12, wherein determining estimated costs for executing queries comprises using statistical data regarding historical interaction with a data store system.

14. The computer readable medium of claim 12, wherein determining estimated costs for executing queries comprises using specialized cost prediction modules included as part of a data store system.

15. In a computing environment, a computing system comprising:

one or more processors; and one or more physical computer readable media coupled to the one or more processors, wherein the one or more physical computer readable media comprise computer executable instructions that when executed by the one or more processors perform the following:

accessing a first search predicate, the first search predicate constructed with one or more nested logical AND, OR, or NOT operands;

normalizing the first search predicate to a normalized search predicate that is a canonical form logically equivalent to the first search predicate such that the normalized search predicate includes at least three and up to four ordered levels and the normalized search predicate is partitioned at the top level into a set of OR components, wherein normalizing the first search predicate to a normalized search predicate comprises applying one or more logical rules to the first search predicate and wherein logical rules are applied recursively, wherein all top or first level operands are logically ORed, wherein all second level operands below the top level operands are logically ANDed, wherein each third level operand below the second level operands is at least one of a parameter or logical NOT, and wherein any fourth level operands below a third level logical NOT operand are parameters; and using the normalized search predicate, searching a plurality of data stores in a federation of data stores for information by searching different data stores for at least two or more of the top level operands, comprising searching for a first component filter and a second component filter and merging the results and by searching with one or more sub-filters to obtain one or lists and applying one or more other sub-filters to the one or more lists.

16. The system of claim 15, wherein normalizing the first search predicate to a normalized search predicate comprises recursively applying one or more logical rules to the first search predicate.

* * * * *